United States Patent [19]

Cantrell et al.

[11] 4,010,969
[45] Mar. 8, 1977

[54] IMPACT RESISTANT LIGHTWEIGHT, LOW COST AUTOMOBILE BUMPERS AND METHOD OF MAKING SAME

[75] Inventors: Ronald G. Cantrell, Birmingham; Barron L. Katchka, Pontiac, both of Mich.

[73] Assignee: Houdaille Industries, Inc., Buffalo, N.Y.

[22] Filed: May 17, 1973

[21] Appl. No.: 361,245

[52] U.S. Cl. .................................. 293/98; 293/70; 148/145
[51] Int. Cl.² .................................. B60R 19/02
[58] Field of Search .................. 293/1, 70, 98, 99; 148/145, 151

[56] References Cited

UNITED STATES PATENTS

| 947,486 | 1/1910 | Giolitti | 148/145 |
|---|---|---|---|
| 1,325,746 | 12/1919 | Lyon | 293/98 |
| 1,446,354 | 2/1923 | Smith et al. | 148/145 |
| 1,481,964 | 1/1924 | Lyon | 293/98 |
| 1,481,965 | 1/1924 | Lyon | 293/98 |
| 1,898,229 | 2/1933 | Veale | 293/98 |
| 2,882,191 | 4/1959 | Van Swaal | 148/151 |
| 3,702,202 | 11/1972 | Rumsey | 293/99 |

*Primary Examiner*—Robert W. Saifer
*Attorney, Agent, or Firm*—Hill, Gross, Simpson, Van Santen, Steadman, Chiara & Simpson

[57] ABSTRACT

Automobile bumpers formed from rolled sheet steel and each having a cross-sectional profile designed to carry impact loads without additional reinforcements, and which are selectively hardened to withstand impact of a high order of magnitude without damage. At least an area of the bar coextensive along the bar remains unhardened and serves to control and avoid distortion of the hardened areas. In a relatively large shell bumper profile, longitudinal areas near the neutral axis of the profile remain unhardened and there are longitudinal hardened areas at the profile portions farthest from the neutral axis.

A method of and means for effecting selective hardening of the bumper face bars are also disclosed.

16 Claims, 6 Drawing Figures

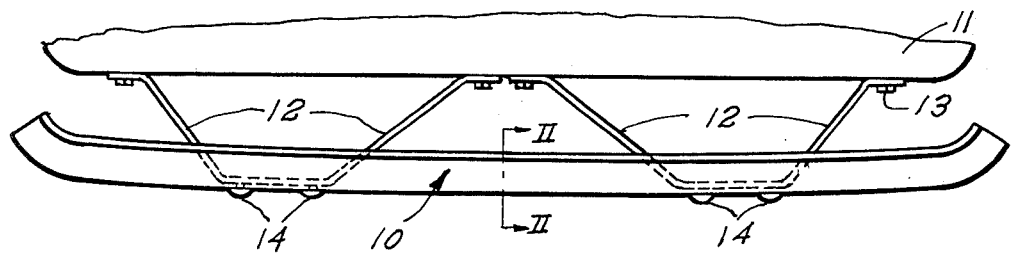
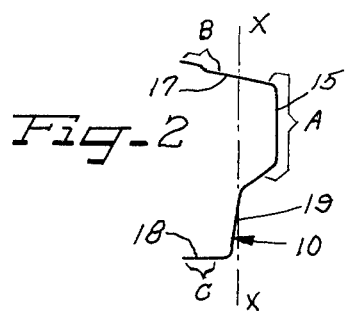
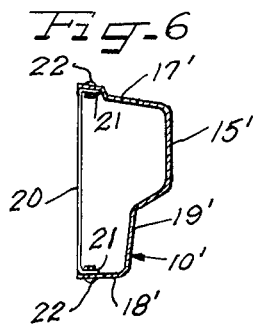
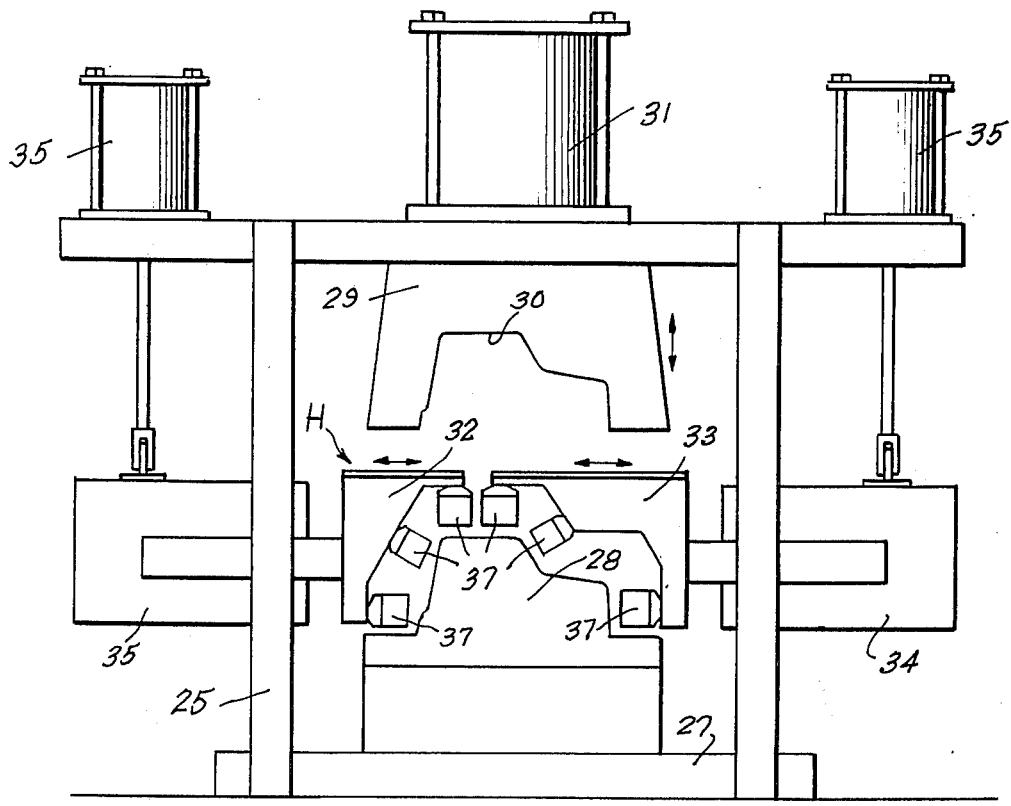

IMPACT RESISTANT LIGHTWEIGHT, LOW COST AUTOMOBILE BUMPERS AND METHOD OF MAKING SAME

This invention relates to the provision of automobile bumpers, and is more particularly concerned with impact resistant, lightweight, low cost automobile bumpers and method of making the same.

Although numerous and varied structures, devices and arrangements have been proposed to protect automobile bumpers against damage from at least the numerous minor collisions to which such bumpers are subjected in the operation of an associated vehicle, there is a continuous struggle to reduce costs and dead weight in respect to the bumper installations. These criteria have become especially pertinent because in order to meet insurance industry and Government guide lines and standards additional impact cushioning, snubbing, absorbing, reinforcement structures have been incorporated in and associated with the bumper face bars. Such expedients have not only added parts to the associated vehicles but have increased costs and have added dead weight to the ends of the vehicles, thereby often requiring larger tires, stronger suspensions, heavier frames, heavier brakes, and the like.

A special problem has existed in the construction and styling of bumpers to provide efficient means to transmit impact energy to the energy absorbing devices attached to the vehicle body. To attain adequate beam strength in prior bumpers it has generally been necessary to provide reinforcement, often in the form of added bar structure, or the section mass has been substantially increased.

One proposed expedient has consisted in making the bumper face bars from extruded aluminum sections. Immediately a cost differential arises because the aluminum material cost is over four times as great per pound as steel sheet suitable for the purpose, and a severe handicap on efficient use of material exists because of requirement for constant cross section in such an extrusion. This is wasteful of material because a constant cross section is not actually necessary to attain adequate impact resistance. Aluminum does, of course, have an advantageous weight saving factor as compared to a cold formed mild steel section of roughly equivalent impact resistance or yield strength such as S.A.E. 1008 heretofore commonly used for bumper face bars.

It is accordingly an important object of the present invention to provide a formed sheet steel bumper bar which will meet extremely high standards of impact resistance and which is possessed of a weight factor competitive with an equivalent extruded aluminum section, but at much lower cost.

Another object is to provide a new and improved formed sheet steel automobile bumper bar which will meet extremely high standards of impact resistance without requiring the added weight and cost of reinforcement of the face bar as heretofore necessary with prevailing materials and designs.

A further object of the invention is to provide a new and improved automobile bumper bar structure formed from a strip of rolled sheet steel and possessed of unusual beam strength and yield strength.

A still further object of the invention is to provide a new and improved sheet steel bumper bar which can be economically formed according to preferred shaping practice and which has those areas thereof most susceptible to impact force damage hardened to a satisfactorily high yield strength and free from detrimental warpage.

Still another object of the invention is to provide a new and improved formed sheet steel bumper with selectively heat treated areas to provide unusual yield strength in the areas thereof most vulnerable to impact damage, and to provide desirable resilience to resist permanent deformation.

Yet another object of the invention is to provide a new and improved method of making shaped automotive vehicle bumper bars from rolled sheet steel.

Other objects, features and advantages of the invention will be readily apparent from the following description of preferred embodiments thereof, taken in conjunction with the accompanying drawings, although variations and modifications may be effected without departing from the spirit and scope of the novel concepts embodied in the disclosure, and in which:

FIG. 1 is a schematic illustration showing an automobile bumper embodying features of the invention;

FIG. 2 is a schematic sectional view taken substantially along the line II—II of FIG. 1;

FIG. 3 is a schematic illustration of apparatus embodying features of the invention and adapted to practice the method of the present invention for selectively hardening formed sheet steel bumper face bars;

FIG. 6 shows a modified construction of the bumper.

Figure 4:
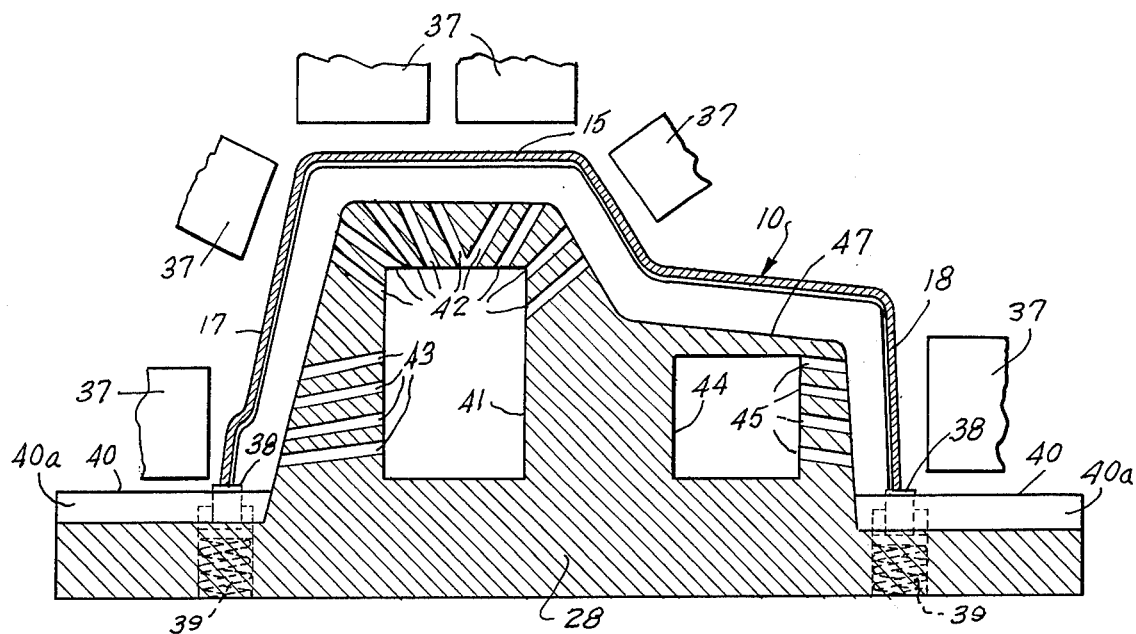
FIG. 4 is an enlarged fragmentary schematic illustration of the apparatus in the selective heating mode.

Having reference to FIGS. 1 and 2, a representative automotive vehicle bumper bar 10 formed from a strip of rolled sheet steel is of a length to extend across the front or rear end of an automotive vehicle 11 and is supported outboard therefrom by any preferred bumper supporting means such as bars 12 extending therefrom and suitably secured as by means of bolts 13 to the vehicle and as by means of bolts 14 to the inner face of the bumper bar. For example, the support bars 12 may be of the buckling column bar type covered in U.S. Pat. No. 3,702,202 providing an energy storing and absorbing and self-recoverable bumper support system capable of yielding resiliently on imposition of impacts against the bumper at a velocity of on the order of 5 miles per hour without damage to the bumper assembly or to the vehicle in a short displacement travel distance toward the vehicle of on the order of 1½ to 2½ inches. Any other preferred bumper support system which will comply with insurance industry or Government standards may be employed.

A principal aim of the present invention is to provide adequate beam strength and field strength in an automotive vehicle bumper bar to withstand impacts specified according to Department of Transportation Federal Motor Vehicle Safety Standard No. 215 i.e. 5 mph pendulum and barrier impact tests, without requiring any reinforcement even though the bumper bar is formed from rolled sheet steel of relatively thin gauge for light weight and low cost. For most efficient use of material with the lightest weight structure, the bumper bar should be of U-shape or C-shape profile and designed such that it possesses a moment of inertia value to withstand the impact tests, based on the weight of the vehicle and the span of the bumper supports. According to the present invention this aim is attained by selectively heat treating the bumper bar in those areas which are most susceptible to damage from bending stresses caused by impacts against the bumper bar. Furnace hardening of the bumper is not as satisfactory and is not currently practiced because the rolled sheet material from which the bumper bars are made distorts badly during furnace heating and subsequent quenching and requires annealing and straightening to relieve the distortions. Further, furnace hardening is a time-consuming process which requires elaborate equipment, especially for objects as large as automobile bumper bars.

We have found that excellent results are obtained by selectively hardening those areas of the bumper bar which are most susceptible to impact damage and permanent set and leaving the remaining areas of the bumper bar section unhardened as an aid to control of distortion and to alleviate the need for stress relief. By way of example, a bumper bar 10 is shown in FIG. 2 shaped to provide a profile including a face area 15 along its length. In this instance, where the bumper bar 10 is of generally U or C shaped profile, a generally rearwardly or inboard extending top flange 17 merges with the upper side of the face 15, and a lower inwardly or inboardly extending flange 18 is joined to the face 15 by means of a downwardly extending inset portion 19.

In an especially desirable construction, a substantial width area of the flange 17 contiguous to the face 15, and the lower body portion 19 both remain unhardened, that is in substantially the same condition as after completion of the drawing or forming operation during which the bumper bar shell was converted from rolled sheet steel stock, because these areas are near the neutral axis X—X (FIG. 2) and therefore are not highly stressed. In the section profile form of the bumper bar 10, necessary yield strength is attained by not only having the face area 15 hardened, but also the free marginal portions of the flange 17 and the flange 18. The hardened bumper face area is indicated in FIG. 2 by the bracket A, the hardened area of the flange 17 is identified by the bracket B, and the hardened area of the flange 18 is indicated by the bracket C. The areas of the bumper bar intervening between the areas A and B on the one hand and the areas A and C on the other hand, remain unhardened and thus aid in avoiding distortion of the bar.

As a result of the efficiently selectively hardened area structure of the bumper bar 10, no reinforcement is required within or in association with the bumper to provide beam strength and the bumper supports 12 may be attached directly to the inside of the bumper at the face area 15 as shown in FIG. 1. A bumper bar of the equivalent beam strength with presently used material would have to be approximately four times the gauge of material usable according to the present invention with selective hardening. The considerable weight reduction in the bumper 10 as thus constructed is readily evident.

Where, for any reason, it is desirable to provide additional stabilizing means for the bumper bar, as, for example, in respect to bumpers intended for heavier vehicles or at least vehicles that in expected usage must be provided with bumpers of greater impact resistance than an ordinary lighter weight or compact passenger automobile would require, the structure shown in FIG. 6 may be provided. For example, the bumper face bar 10' may be equipped with vertical stabilizing straps 20 at suitable intervals, and these straps may be of a construction permitting attachment of the bumper support means, such as the supporting bars 12 of FIG. 1 directly thereto. On the other hand, the straps 20 may be merely relatively narrower straps located at, for example, about the central portion of the bumper bar and adjacent to or at the ends of the bar. In any event, the straps need only be of limited width and provided with means at the upper and lower ends for attachment to the flanges 17' and 18' of the bumper bar. For example, angular attachment flanges 21 may be provided on the respective ends of the strap 20 for attachment to the inside of the respective bumper bar flanges as by means of bolts 22. It will be understood, of course, that the face area 15' and the free end marginal portions of the flanges 17' and 18' will be selectively hardened as described in relation to the bumper bar 10 of FIGS. 1 and 2, with intermediate areas of the bumper bar remaining unhardened as previously explained and for the same purpose.

Selective hardening of the bumper face bar is most efficiently and inexpensively accomplished by heat treatment of the selected areas of the bar and quenching. Although heating of the selected areas may be accomplished in any suitable manner such as by resistance heating, induction heating or flame heating, the latter, namely flame heating is a preferred method. In any event, the method involves first forming the sheet metal blank into the desired profile. If the profile is relatively severe or deep formed, the form piece may be stress relieved at a suitable less than hardening temperature. Then the areas to be selectively hardened are selectively heated to hardening temperature, and lastly the piece is fixtured and quenched. Apparatus as schematically illustrated in FIGS. 3, 4 an 5 is desirably provided for the special purpose of production heat treating bumper face bars such as the bar 10. The apparatus comprises a suitable supporting frame 25 over and about a bed 27 on which is mounted a stationary male quenching and fixturing die 28 dimensioned to be received within the shell cavity of the bumper bar 10. Supported by the upper portion of the frame 25 is a female quenching and fixturing die 29 which is provided with a cavity 30 conforming to the finished outer face of the bumper bar 10. Means such as a fluid operated actuator 31 comprising a piston and cylinder device are provided for raising and lowering the die 29 relative to the lower die 28 not only to provide clearance for loading and unloading the apparatus, but also to provide clearance to permit flame heating means generally represented at H to function after the bumper bar has been loaded onto the lower die 28. In a preferred form the heating means H comprise a pair of complementary flame heads 32 and 33 which are separably mounted on the frame 25 by suitable means 34 for horizontal reciprocation relative to one another and to the lower die 28 and free to oscilate during the heating portion of the cycle. Suspension means for the flame heads 32 and 33 may comprise respective piston and cylinder devices 35 carried by the frame 25 for vertical adjustment of the flame heads for optimum results. Each of the flame heads has flame nozzles 37 which are located to impinge hardening flame onto the selected areas of the bumper bar. It will be understood, of course, that there are rows of the flame nozzles 37 located in lines along the linear areas of the bumper bar 10 to be selectively hardened. Any suitable means for supplying the flame nozzles 37 with flame fueled by means of any preferred fuel, i.e. gas, suitable for the purpose may be provided, and it will be understood that the flame heads 32 and 33 will be supplied with suitable duct passages communicating with the nozzles 37 in the manner of headers and branch ducts, receiving fuel supply from any desired source such as a fuel tank under pressure, or the like. Any preferred control means for controlling the burn cycle of the nozzles 37 may be provided.

In an operating cycle of the apparatus, the bumper bar 10 as formed and unhardened, but desirably stressed relieved, is mounted over the lower die 28, in the manner depicted in FIG. 4 where the complementally shaped profile of the die is received within the shell cavity of the bumper member 10. In order to avoid heat sink, the bumper bar is during the selective heating held in spaced relation to the adjacent surfaces of the die 28, as by means of lifting plungers 38 located along the base of the die 28 and normally biased yieldably as by means of compression springs 39 to project upwardly from closure plates 40. As will be observed, the plungers 38 support the bumper bar 10 in minimal spaced relation to the adjacent surfaces of the die 28. Then, the flame heads 32 and 33 which were retracted during the loading step are closed toward the die 28 to position the orifices of the flame nozzles 37 in proper relation to the respective areas of the bumper bar 10 to be flame hardened. As will be observed, there is a row of the flame nozzles 37 located to impinge flame upon the free marginal band areas of each of the flanges 17 and 18. Other rows of the flame nozzles 37 are provided to impinge flame on the selected band area of the face 15. Flame is impinged on all of the selected bumper areas or sections simultaneously throughout the full length of the part, and the heads 32 and 33 oscillated along the length of the bumper to assure complete bands of hardening.

Figure 5:
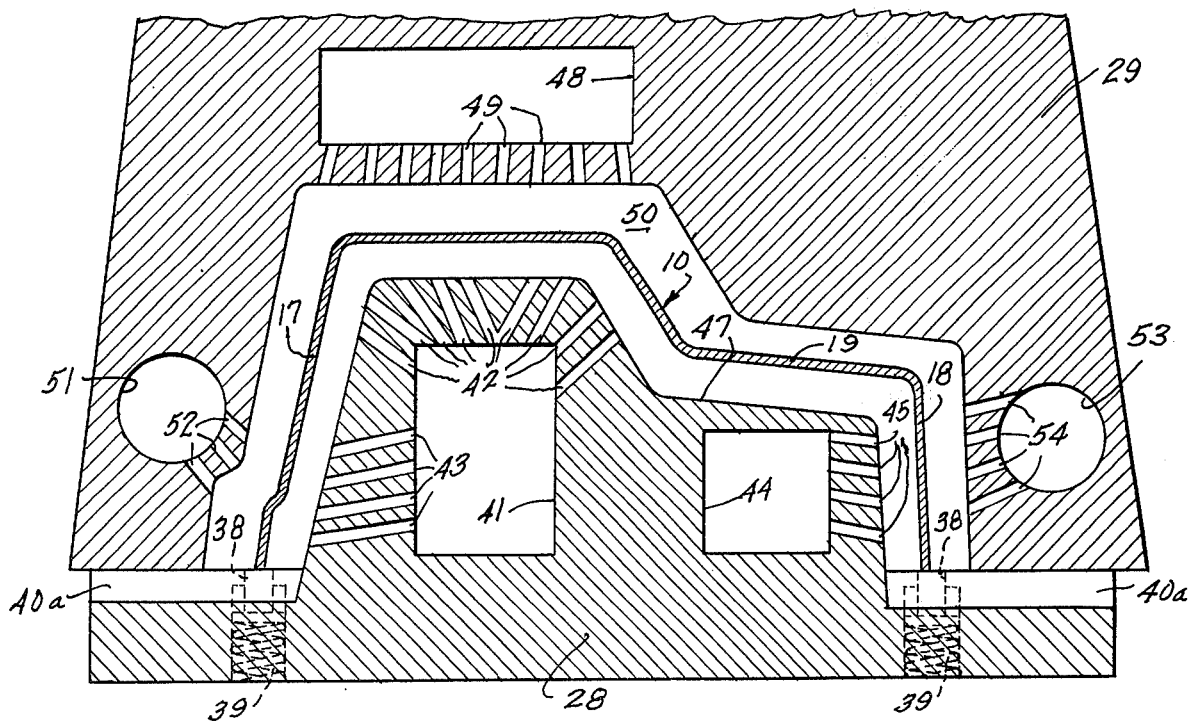
FIG. 5 is an enlarged fragmentary sectional view showing the apparatus in the bumper bar fixturing and quenching mode.

After the bumper bar 10 has been suitably heated at the selected areas, as may be determined by suitable heat responsive means such as a milliscope or other suitable temperature monitoring equipment, the heating heads 32 and 33 are retracted, and the upper fixturing and quenching die 29 is brought into engagement with the selectively heated bumper bar 10 and pressed thereagainst to depress the bumper bar into engagement with the lower quenching and fixturing die 28 as permitted by the yielding of the plungers 28 which are pressure retracted by the female die 29 into the plates 40 in opposition to the biasing springs 39, as depicted in FIG. 5.

By having the die surfaces of the die members 28 and 29, complementary to the profile of the bumper bar 10, the heated bar will be fixtured to eliminate any local distortions that may have resulted from the selective heating and also to accelerate quenching by heat sink into the die members, in addition to liquid quenching as by means of relatively cold water applied to the heated areas of the bumper bar from the die members 28 and 29. To facilitate liquid quenching, the lower die member 28 is provided with suitable header means and quenching fluid ports, comprising, for the particular profile shown for the bar 10, a header passage 41 having sets of ports 42 directed toward the inner surface of the nose 15 and sets of ports 43 directed toward the selectively heat treated area of the flange 17. Due to the relatively spaced relation of the flange 18, a second header passage 44 is provided in the die 28 from which lead quenching ports 45 which are directed toward the inner face of the heat reated flange 18. In order to permit circulation and drainage, drainage grooves 40a are in the plate structure 40 and the die face of the die member 28 is desirably provided with transverse circulation grooves 47, there being as many of such grooves as desired in generally parallel relation along the length of the die. In similar fashion, the die member 29 has a fluid header passage 48 from which lead quenching fluid ports 49 directed toward the nose area 15 of the bumper bar through transverse circulation grooves 50 in the die face of member 29. To assist in rapid quenching of the heat treated area of bumper bar flange 17, a header passage 51 supplies quenching fluid to quenching ports 52 leading therefrom to direct quenching fluid to the heat treated area of the flange 17. In similar fashion a quenching fluid header 53 in the die member 29 is located to supply quenching fluid through ports directed toward the outer surface of the flange area 18 that has been heated. Through this arrangement, rapid, efficient hardening is effected for high speed production.

Although only one representative heat treating unit of the apparatus has been shown, it will be understood that a plurality of such units may be mounted on either a rotary indexing or a fixed platen type of machine base, with suitable motion control devices and timers, regulators, mixers, solenoid valves, etc. to control the operating cycles.

Instead of the flame nozzles 37, the apparatus may be provided with induction heating equipment such as induction coils with the proper design of laminations, or powdered iron current flow directors and or generating equipment of suitable size in association with the apparatus.

The steel sheet material for production of the bumper bar 10 should be selected from a grade that has the proper cold forming and heat hardening characteristics. Of course, the lower the carbon content the easier cold forming can be accomplished. On the other hand the higher the carbon content the greater the hardening characteristics. A good carbon content for the present purpose is within a range of from 0.12 to 0.17 percent, with 0.14 percent being the ideal. Proper proportions of boron, manganese, molybdenum and rare earths for cleanliness and fine grain should also be provided so as to attain good thermal transformation characteristics. The material should have an elongation characteristic of about 8 percent after hardening. Such steel sheet must be capable of being formed in the as-rolled condition, must be responsive to fast heating cycle, must have the ability to quench to a martensitic structure, and be of a lean grade.

During the heating cycle the heating should be accomplished in about 15 seconds to a selective heat in a range of 1650° F. to 1700° F. for a material on the order of 0.080 gauge. Then, the transition from heating to quenching should be accomplished within about 0.2 to 0.3 second, with immediate quenching as the female die bottoms out the work piece onto the male die member. The quenching temperature may be about 70° F, with the quenching fluid supply controlled by any suitable means such as solenoid valves. The quenching fluid such as water may be applied for on the order of 9 seconds, after which the female die raises to permit removal of the finished part and insertion of another part for a repeat cycle.

A bumper produced according to the present method will have adequate beam strength to be used without reinforcement because the hardened areas will be within a range of minimum yield of 120,000 psi. The weight of the bumper system is reduced. A bright finish can be applied to bumpers which are produced according to the method of the present invention. Impact and dinging resistance is provided in those areas of the bumper most liable to damage. By having the upper flange of the bumper of substantial length, need for a sight shield can be eliminated. In any event the bumper complies with present minimum insurance and government standards of resisting damage from impacts of 5 miles per hour.

It will be understood that variations and modifications may be effected without departing from the spirit and scope of the novel concepts of this invention.

We claim as our invention:

1. A shaped automobile bumper bar formed from a strip of rolled sheet steel and having a designed cross sectional profile providing an elongated body portion and generally angularly projecting integral upper and lower portions which extend along the length of the bumper bar:

said body portion having a hardened area;
    at least one of said angularly projecting portions having a hardened area;
    said hardened areas being located at respective opposite sides of the vertical neutral axis between said areas; and
    unhardened area between said hardened areas and lying at or near said vertical neutral axis;
    whereby the bumper bar is free from detrimental warpage and is possessed of beam strength and yield strength to withstand bending stresses from impact forces of substantial magnitude without significant damage.

2. A bumper bar according to claim 1, wherein said profile is of substantially U-shape and said angularly projecting portions comprise longitudinal flanges in vertically spaced relation, said body portion projecting outboard.

3. A bumper according to claim 2, including stabilizing strap means secured to and extending vertically between said flanges.

4. A bumper bar according to claim 1, in which said steel has a carbon content in a range of 0.12 to 0.17 percent and the hardened areas possess about 8 percent elongation and possess a yield strength of about 120,000 psi.

5. A method of making an automobile bumper bar from a strip of rolled sheet steel comprising:

shaping a designed cross sectional profile to provide an elongated body portion and generally angularly projecting integral upper and lower portions extending along the length of the bumper bar;
    hardening an area along the length of said body portion and hardening an area along the length of at least one of said angularly projecting portions, with said areas located at respective opposite sides of the vertical neutral axis between said areas;
    leaving unhardened area between said hardened areas to lie at or near said vertical neutral axis; and
    thereby maintaining the bumper bar free from detrimental warpage and providing the bumper bar with a beam strength and yield strength to withstand bending stress from impact forces of substantial magnitude without significant damage.

6. A method according to claim 5, wherein profile is of generally U-shape and said angularly projecting portions comprise vertically spaced flanges, and hardening band areas on said body portion and along free marginal portions of said flanges separated from said body portion by said unhardened areas.

7. A method according to claim 5, comprising hardening said areas in a selective heating and quenching sequence.

8. A method according to claim 5 including placing said bar over a male fixturing and quenching die received within the bar profile, applying heat to harden said areas selectively, thereafter applying a female fixturing and quenching die in engagement with the bar profile and into cooperation with the male die to fixture the bar profile and from the dies applying quenching fluid to the heated areas to complete hardening thereof.

9. A method according to claim 8, including supporting the bar profile out of contact from the male die received therein during the selective heating of said areas, and in the fixturing cooperation of said dies pressing the bar profile against the male die member by pressure applied through said female die member.

10. A method according to claim 5, comprising shaping said bar from rolled steel having carbon content in a range of 0.12 to 0.17 percent.

11. A method according to claim 10, including effecting a yield strength in said hardened areas of about 120,000 psi.

12. A thin sheet steel bumper bar constructed to be mounted protectively across an end of an automotive vehicle:

said bumper bar having an elongated body portion;
    spaced apart inboardly extending integral portions on said body portion;
    said body portion being hardened throughout at least its major extent to provide it with beam strength and yield strength to withstand repeated impact of a high order of magnitude without significant damage;
    said inboardly extending portions being at least in part unhardened adjacent to said body portion;
    buckling column steel bars for mounting the bumper across the end of an automotive vehicle and said bars extending from an inboardly facing inner surface of said body portion intermediate said inboardly extending portions; and
    bolts fastening said bars fixedly directly to said inner surface of the body portion.

13. A bumper bar according to claim 12, wherein said steel has a carbon content in a range of 0.12 to 0.17 percent and the heat and quench hardened body portion possesses a yield strength of about 120,000 psi.

14. A bumper bar adapted to be mounted protectively across an end of an automotive vehicle;

the bar being formed from easily workable sheet or strip steel and having an elongated body portion and spaced apart integral portions extending angularly away from the body portion;
    said body portion being heat and quench hardened throughout its major extent to provide it with beam strength and yield strength to withstand repeated impact of a high order of magnitude without significant damage; and
    said spaced apart portions being at least in part free from heat and quench hardening adjacent to said body portion;

said spaced apart portions comprising flanges extending along the upper and lower sides of said body portion;

said flanges being in part heat and quench hardened except adjacent to said body portion leaving areas between the hardened pairs of the flanges and the body portion free from heat and quench hardening.

15. A method of making a bumper bar of a length to be mounted protectively across an end of an automotive vehicle, comprising:

shaping a suitable length of easily workable steel into desired bumper bar profile with an elongated body portion and spaced apart portions in the form of top and bottom flanges along said body portion extending angularly from the body portion;

heat and quench hardening said body portion throughout its major extent and thereby providing it with a beam strength and yield strength to withstand bending stresses from repeated impact forces of a high order of magnitude without significant damage; and effecting heat and quench hardening along parts of the flanges spaced from the body portion while leaving limited areas of the material of the bar between the body portion and the hardened parts of the flanges substantially free from heat and quench hardening.

16. A bumper bar adapted to be mounted protectively across an end of an automotive vehicle;

the bar being formed from easily workable sheet or strip steel and having an elongated body portion and spaced apart integral portions extending angularly away from the body portion;

said body portion being heat and quench hardened throughout its major extent to provide it with yield strength to withstand repeated impact of a high order of magnitude without significant damage;

said spaced apart portions being at least in part free from heat and quench hardening adjacent to said body portion and comprising flanges along upper and lower sides of said body portion; and areas lying at or near the vertical neutral axis between said body portion and said flanges being unhardened.

* * * * *

UNITED STATES PATENT OFFICE
CERTIFICATE OF CORRECTION

PATENT NO. : 4,010,969
DATED : March 8, 1977
INVENTOR(S) : Ronald G. Cantrell & Barron L. Katchka It is certified that error appears in the above-identified patent and that said Letters Patent are hereby corrected as shown below:

Column 2, line 56 for "field" read --yield--;
Column 3, line 5, after "bumper" read --bar--

Signed and Sealed this twelfth Day of July 1977

[SEAL]

Attest:

RUTH C. MASON
Attesting Officer

C. MARSHALL DANN
Commissioner of Patents and Trademark.